United States Patent
Popovich et al.

(10) Patent No.: US 12,035,033 B2
(45) Date of Patent: Jul. 9, 2024

(54) DNN ASSISTED OBJECT DETECTION AND IMAGE OPTIMIZATION

(71) Applicant: Microsoft Technology Licensing, LLC, Redmond, WA (US)

(72) Inventors: Alexander Popovich, Henderson, NV (US); James Alan Holt, Monroe, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 103 days.

(21) Appl. No.: 17/354,675

(22) Filed: Jun. 22, 2021

(65) Prior Publication Data

US 2022/0408013 A1    Dec. 22, 2022

(51) Int. Cl.
*H04N 23/611* (2023.01)
*G06T 7/70* (2017.01)
(Continued)

(52) U.S. Cl.
CPC .......... *H04N 23/611* (2023.01); *G06T 7/70* (2017.01); *G06T 7/80* (2017.01); *H04N 23/64* (2023.01);
(Continued)

(58) Field of Classification Search
CPC .......... H04N 1/00244; H04N 1/00209; H04N 2201/0084; H04N 5/23219;
(Continued)

(56) References Cited

U.S. PATENT DOCUMENTS

2007/0183628 A1* 8/2007 Carlson .............. G06T 7/13
                                                382/103
2010/0246939 A1* 9/2010 Aisaka ............... H04N 5/144
                                                382/156
(Continued)

FOREIGN PATENT DOCUMENTS

CN      105430267 A      3/2016
EP      1990769 A1       11/2008

OTHER PUBLICATIONS

"Convolutional Neural Network—Wikipedia", Retrieved from: https://en.wikipedia.org/w/index.php?title=Convolutional_neural_network&oldid=908472838#Image_recognition, Jul. 29, 2019, pp. 1-27.

(Continued)

*Primary Examiner* — Usman A Khan

(57) ABSTRACT

Systems and methods directed to adjusting an image based on a detected object depicted in the image are described. The method may include receiving an image from an image sensor, receiving statistical information associated with the image, detecting an object depicted in the image using a deep neural network, identifying object-specific statistical information for the detected object, generating a weighted object-specific parameter based on the object-specific statistical information, generating a weighted-image value based on the weighted object-specific parameter, providing the weighted-image value to the image sensor, where the image sensor is configured to update one or more image sensor parameters based on the weighted-image value, and acquiring an image from the image sensor updated with the one or more image sensor parameters.

20 Claims, 7 Drawing Sheets

(51) Int. Cl.
*G06T 7/80* (2017.01)
*H04N 23/60* (2023.01)
*H04N 23/71* (2023.01)
*H04N 23/73* (2023.01)

(52) U.S. Cl.
CPC ............. *H04N 23/71* (2023.01); *H04N 23/73* (2023.01); *G06T 2207/20081* (2013.01); *G06T 2207/20084* (2013.01)

(58) Field of Classification Search
CPC ............ H04N 5/23222; H04N 5/2351; H04N 5/2353; H04N 23/611; H04N 23/64; H04N 23/71; H04N 23/73; G06K 9/6274; G06K 9/6267; G06V 10/40; G06V 10/454; G06V 10/95; G06V 20/00; G06V 10/82; G06V 40/166; G06V 10/14; G06N 3/0454; G06N 3/08; G06T 7/70; G06T 7/80; G06T 2207/20081; G06T 2207/20084
USPC ...................................................... 348/222.1
See application file for complete search history.

(56) References Cited

U.S. PATENT DOCUMENTS

| | | | |
|---|---|---|---|
| 2010/0271507 A1* | 10/2010 | Hung ..................... | H04N 23/71 348/E9.053 |
| 2015/0125049 A1* | 5/2015 | Taigman .............. | G06V 40/173 382/118 |
| 2017/0311013 A1* | 10/2017 | Acharya .......... | H04N 21/23116 |
| 2018/0276845 A1* | 9/2018 | Bjorgvinsdottir ... | G06F 18/2193 |

OTHER PUBLICATIONS

"International Search Report and Written Opinion Issued in PCT Application No. PCT/US2022/029101", dated Jul. 22, 2022, 14 Pages.

* cited by examiner

DNN ASSISTED OBJECT DETECTION AND IMAGE OPTIMIZATION

BACKGROUND

Many image adjustment techniques are performed in software as a post-processing application. That is, after an image is acquired, some effect or processing is performed to adjust image parameters, such as brightness, contrast, color balance, etc. However, while the image adjustment techniques are intended to provide an enhanced image that when viewed by a user, is of better quality than the original image, applying such techniques on a real-time basis, such as in video applications, is not feasible as the amount of processing resources needed to perform such processing techniques are typically not available in a consumer-oriented device, such as a web camera for instance. Further, such techniques are applied to the entire image without regard to specific objects that may be within the image. Thus, the image quality of one or more objects in the image may not benefit from such broad application of the post-processing image adjustment techniques, and in some instances, the broad application of the post-processing image adjustment techniques may provide an image with one or more objects of a reduced quality.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In accordance with examples of the present disclosure, a method of adjusting an image based on a detected object depicted in the image is described. The method may include receiving an image from an image sensor; receiving statistical information associated with the image; detecting an object depicted in the image using a deep neural network; identifying object-specific statistical information for the detected object; generating a weighted object-specific parameter based on the object-specific statistical information; generating a weighted-image value based on the weighted object-specific parameter; providing the weighted-image value to the image sensor, wherein the image sensor is configured to update one or more image sensor parameters based on the weighted-image value; and acquiring an image from the image sensor updated with the one or more image sensor parameters.

In accordance with examples of the present disclosure, a computing apparatus is described. The computing apparatus may include a processor; and a memory storing instructions that, when executed by the processor, configure the apparatus to: receive statistical information associated with an image; receive object detection information from a deep neural network, the object detection information including location information for an object depicted in the image; identify object-specific statistical information based on the object detection information; generate a weighted object-specific parameter based on the object-specific statistical information; generate a weighted-image value based on the weighted object-specific parameter; provide the weighted-image value to an image sensor, wherein the image sensor is configured to update one or more image sensor parameters based on the weighted-image value; and acquire an image from the image sensor updated with the one or more image sensor parameters.

In accordance with examples of the present disclosure, a computer-readable storage medium is described. The computer-readable storage medium may include instructions that when executed by a processor, cause the processor to: receive an image from an image sensor; receive statistical information associated with the image; detect a plurality of objects depicted in the image using a deep neural network; identify object-specific statistical information for the plurality of detected objects; generate weighted object-specific parameters for each of the detected objects based on respective object-specific statistical information; generate a weighted-image value based on the weighted object-specific parameters; and provide the weighted-image value to the image sensor, wherein the image sensor is configured to update one or more image sensor parameters based on the weighted-image value.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

Many image adjustment techniques are performed in software as a post-processing application. That is, after an image is acquired, some effect or processing is performed to adjust image parameters, such as brightness, contrast, color balance, etc. However, while the image adjustment techniques are intended to provide an enhanced image that when viewed by a user, is of better quality than the original image, applying such techniques on a real-time basis, such as in video applications, is not feasible as the amount of processing resources needed to perform such processing techniques are typically not available in a consumer-oriented device, such as a web camera for instance. Further, such adjustment techniques are not object specific. That is, such techniques do not enhance an image specifically with respect to one or more detected objects within the image. For example, an exposure parameter of an image may be adjusted based on a histogram, where the histogram generally provides a distribution of brightness information across an image. To obtain optimal brightness information for the image, a brightness of the entire image may be adjusted based on the histogram. That is, such brightness information is not specific to one or more detected objects depicted in the image; rather, such brightness information corresponds to a distribution of brightness information across the entire image. Thus, adjusting image brightness based on the histogram may cause an object depicted within the image to be displayed in a suboptimal manner.

The present techniques provide real-time image and/or video modification to adjust one or more image sensor parameters based on objects, such as a person's face, that is detected in the image. Moreover, as opposed to previous image adjustment techniques, the techniques described herein go further than simply adjusting a color balance, image brightness, or contrast of the image. As a result, such techniques increase the quality of human communication that can be achieved via digital live and/or recorded video sessions.

Figure 1:
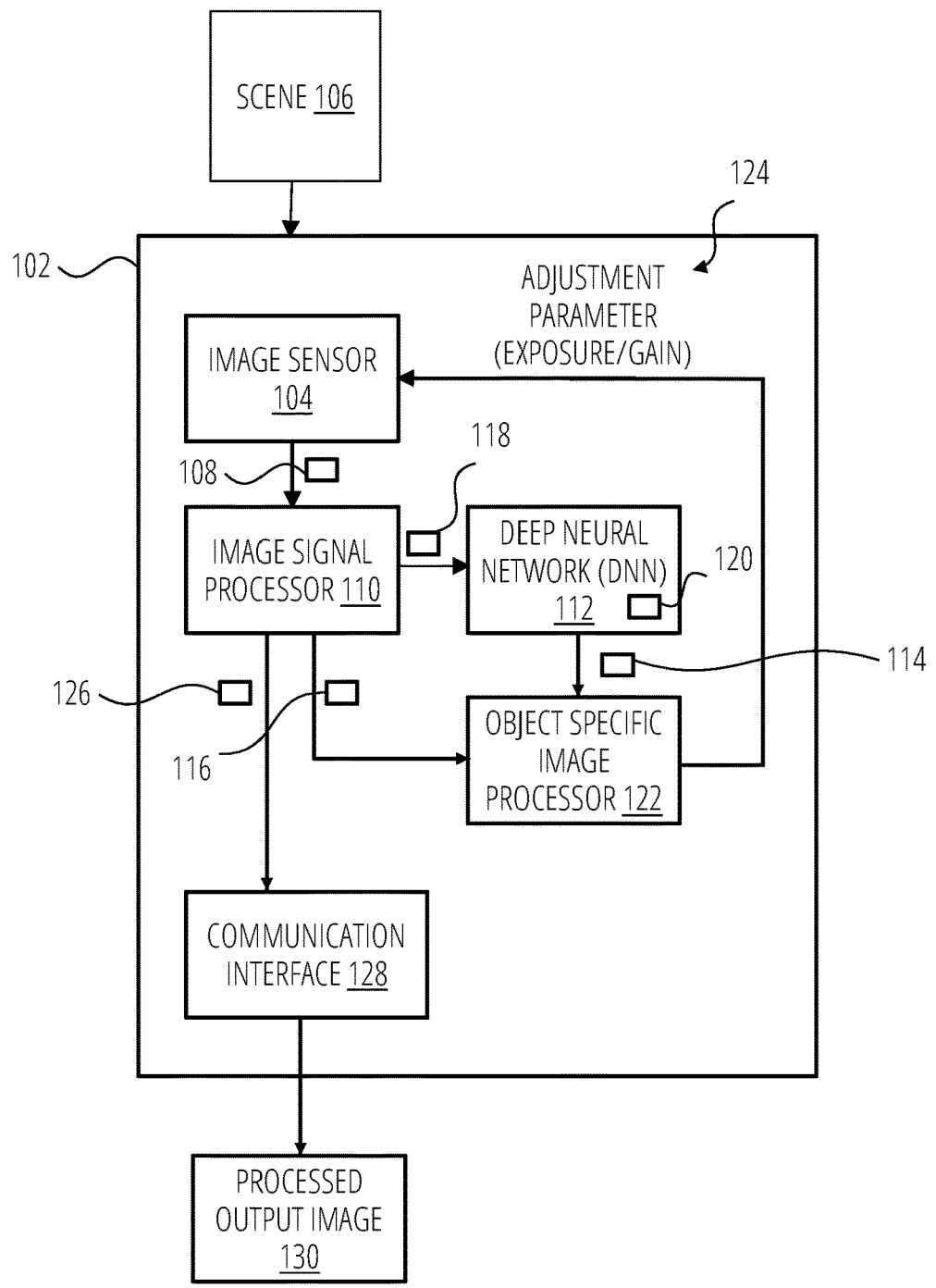

The present techniques provide several improvements over previous techniques for adjusting images. As an example, the present techniques utilize a trained machine learning model to detect objects in an image and adjust an image sensor based on the detected objects within the image. Accordingly, image parameters that are based on detected objects may provide an image that is optimized in terms of the detected object. For example, one or more image sensor parameters may be adjusted based on detected faces depicted in an image. An image acquired with the adjusted image sensor parameters may optimize a brightness, for example, of the faces depicted in the image. In one aspect, additional image processing can be reduced as an acquired image may be optimally acquired based on the detected objects.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

FIG. 1 is a block diagram of an exemplary environment that is suitable for implementing the object-specific image sensor adjustment techniques in accordance with examples of the present disclosure.

Figure 2A:
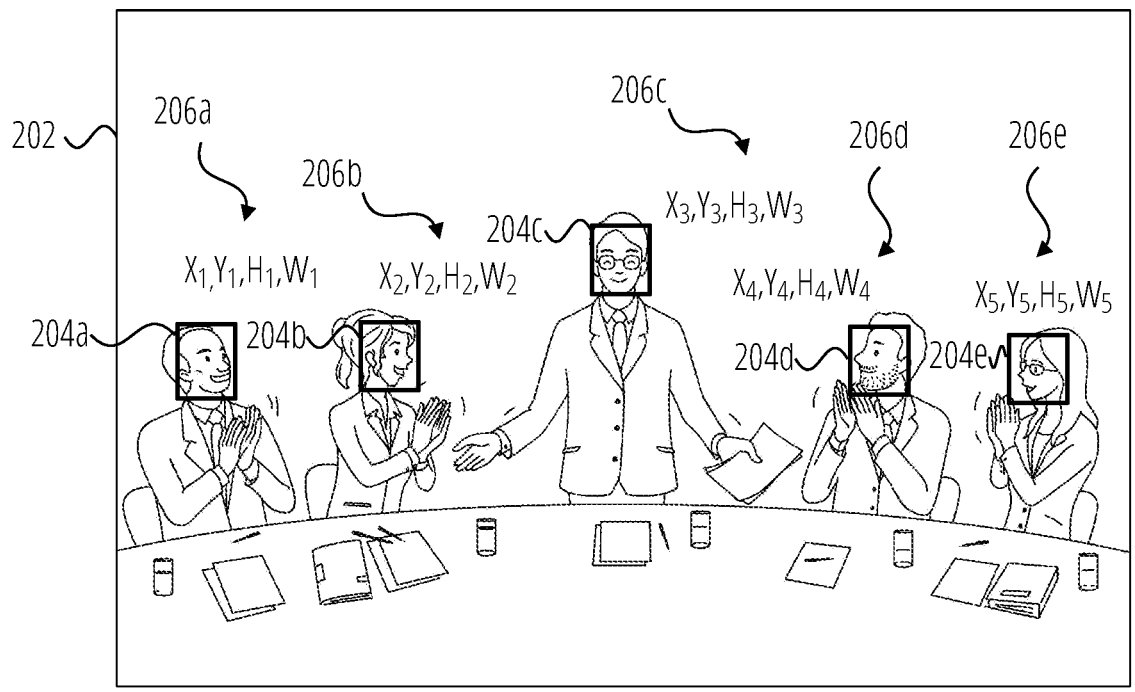

FIG. 2A depicts details related to determining an image sensor parameter based on one or more detected objects in an image in accordance with examples of the present disclosure.

Figure 2A:
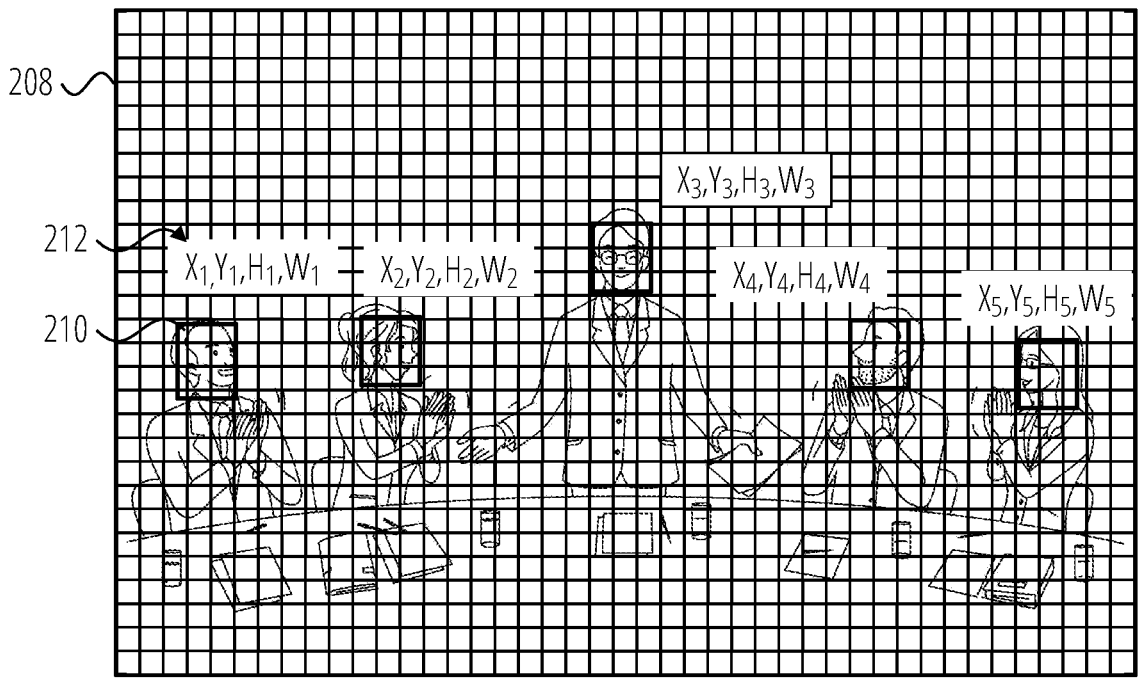
Figure 2B:
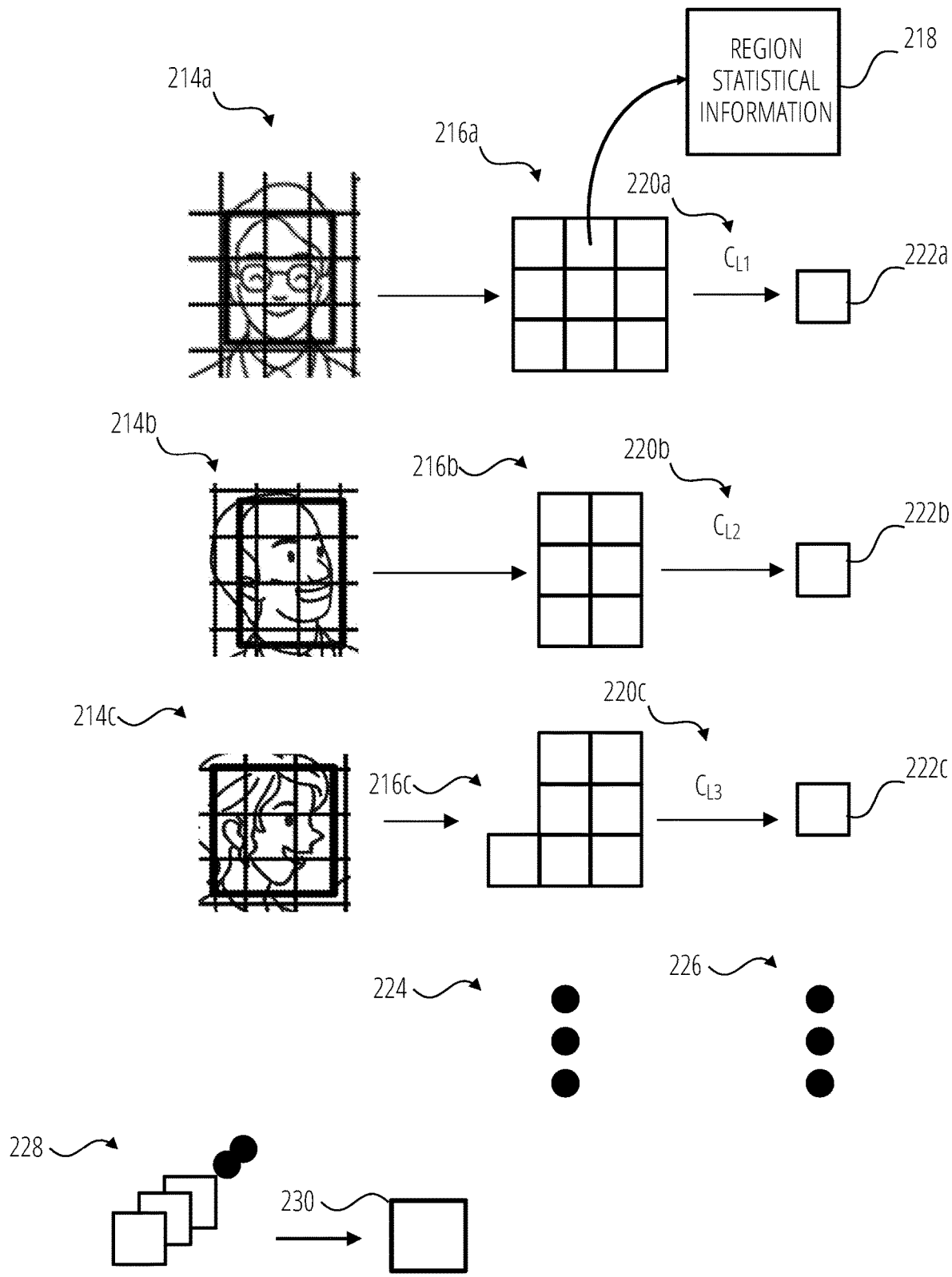

FIG. 2B depicts additional details related to determining an image sensor parameter based on one or more detected objects in an image in accordance with examples of the present disclosure.

Figure 3:
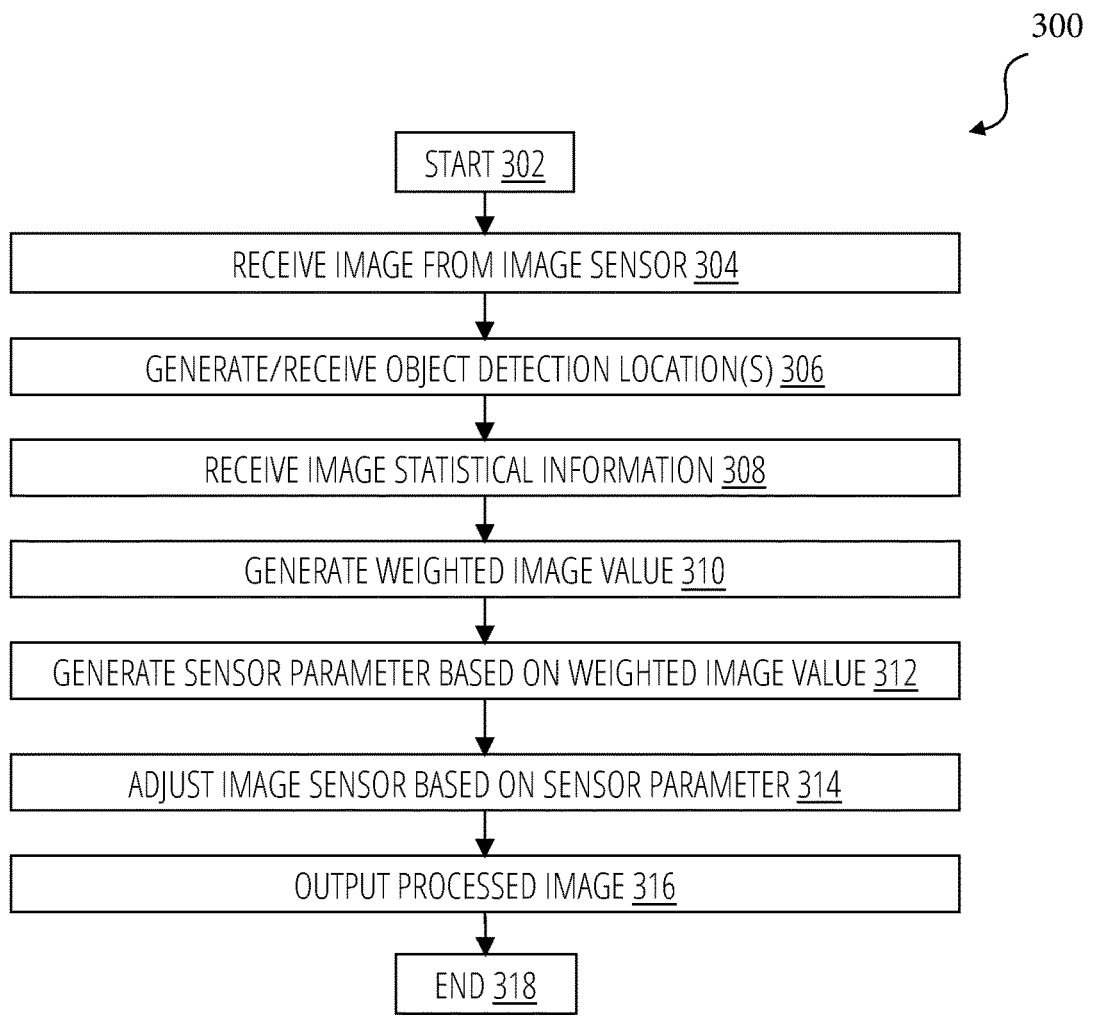

FIG. 3 depicts a block diagram of a computing system that is configured to implement the object-specific image sensor adjustment techniques in accordance with examples of the present disclosure.

Figure 4:
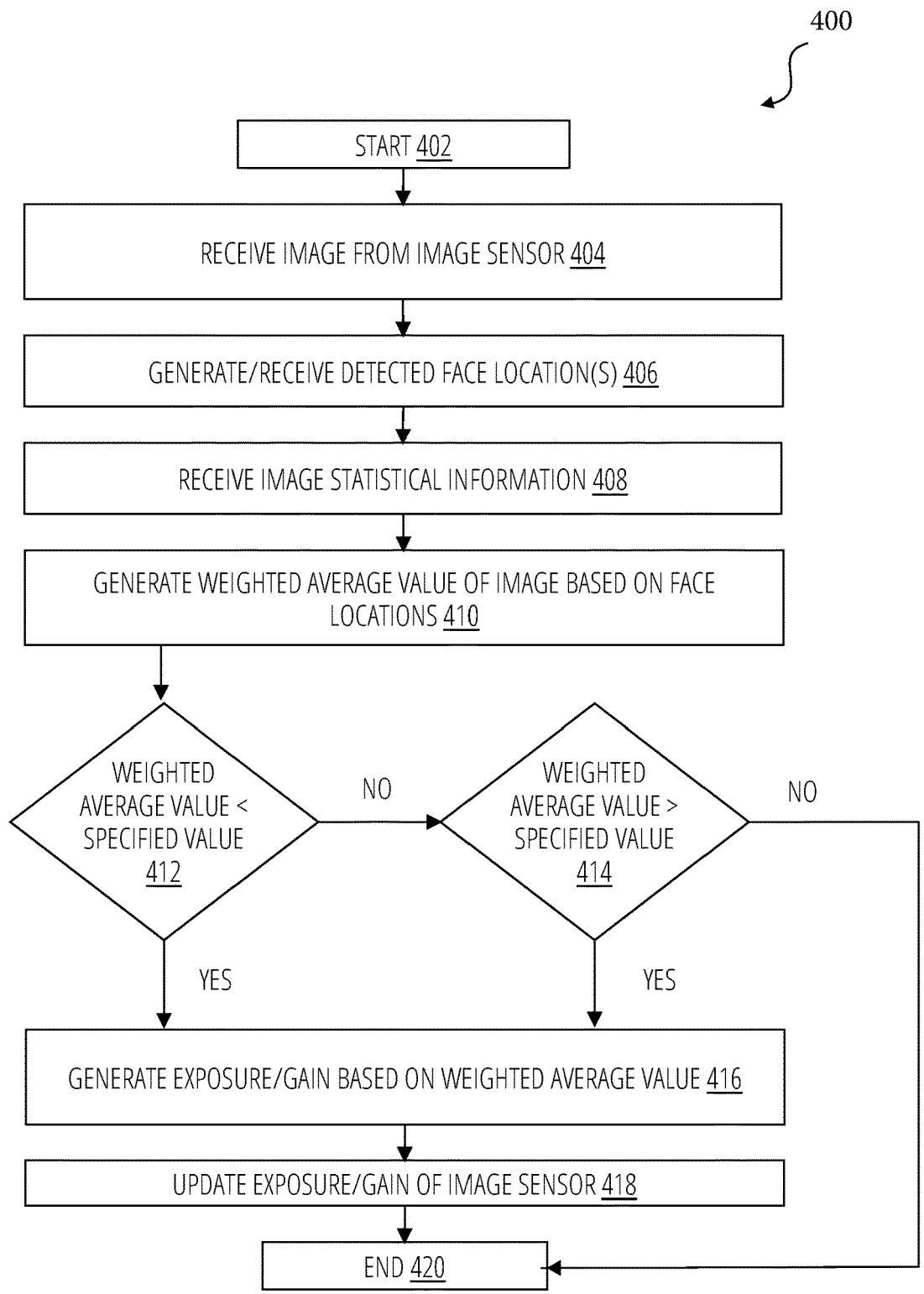

FIG. 4 depicts a method for implementing the object-specific image sensor adjustment techniques in accordance with examples of the present disclosure.

Figure 5:
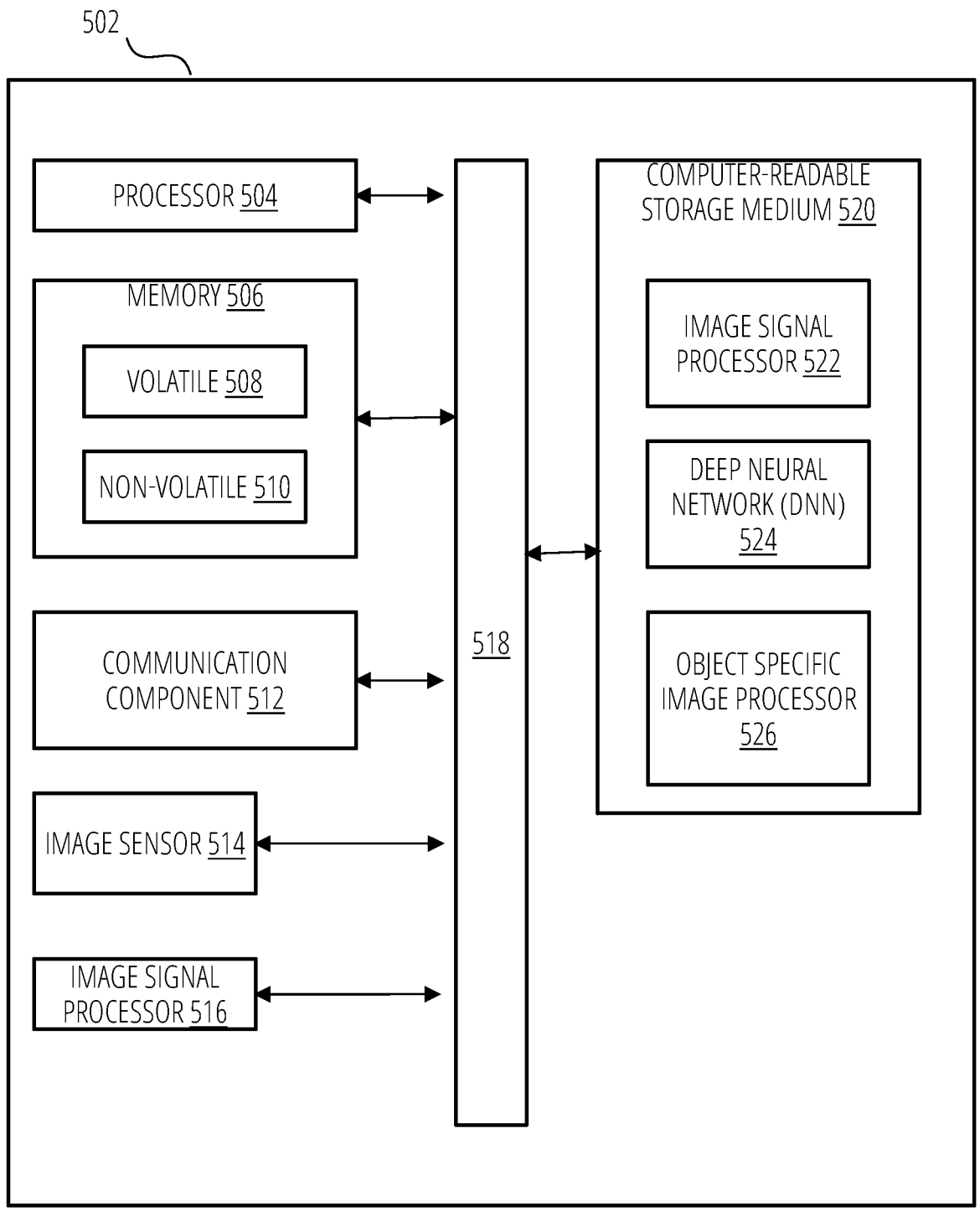

FIG. 5 depicts another method for implementing the object-specific image sensor adjustment techniques in accordance with examples of the present disclosure.

Figure 6:
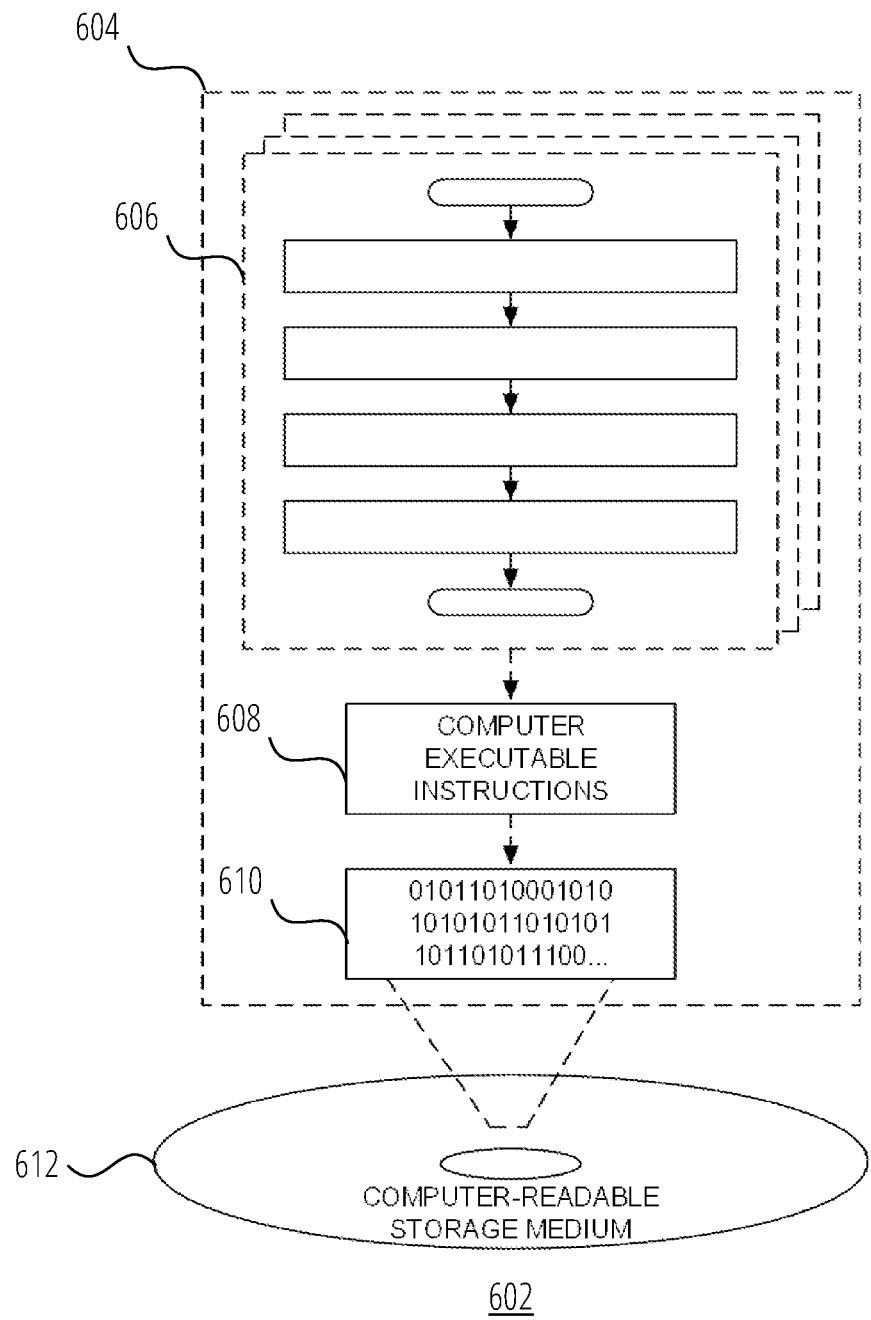

FIG. 6 is a schematic view depicting a manner in which the object-specific image processor may be implemented within a computer-readable storage medium in accordance with examples of the present disclosure.

DETAILED DESCRIPTION

FIG. 1 depicts an image acquisition device 102 in accordance with examples of the present disclosure. The image acquisition device 102 may be a camera, such as a web camera, configured to provide images and/or video to another device. That is, the image acquisition device 102 may be an external component of a computing system, including but not limited to a desktop computer, a laptop computer, and the like. Alternatively, or in addition, the image acquisition device 102 may be a built-in component of another device, for example, integrated into a tablet computer, a laptop computer, mobile phone (e.g., smartphone), wearable computing system, television (e.g., smart TV), set-top box, and/or gaming console. Furthermore, specific examples of the computing image acquisition device 102 may be tailored to each particular type of computing system.

In examples, an image sensor 104 of the image acquisition device 102 may acquire an image of a scene 106. The image sensor 104 may be any image sensor configured to detect and convey information used to make an image. In examples, the image sensor 104 may convert light into signals, which are then processed into pixel information at an image signal processor 110. The image sensor 104 may be a charge-coupled device (CCD) type image sensor, an active pixel type image sensor, such as a complimentary metal-oxide semiconductor (CMOS) image sensor, or the like. The image sensor 104 may provide signal information corresponding to a red, green, blue (RGB) value associated with one or more photodiodes and one or more respective color filters. In examples, the image sensor 104 may provide the signal information as raw image information 108 to the image signal processor 110. The raw image information 108 may be minimally processed data that is acquired by the image sensor 104. The image signal processor 110 may receive the raw image information 108 and convert the raw image information 108 into a processed image 126. In examples, the raw image information 108 may be presented in a Bayer pattern; accordingly, the image signal processor 110 may obtain full red, green, blue (RGB) color information for each pixel by interpolating the raw image information 108. In addition, to generate a processed image 126, the image signal processor 110 may perform YUV coding to convert the RGB color information to an intensity component (Y) that ranges from black to white plus two other components (U and V) which code the color. Of course, other types of color coding may be used other than YUV coding. The processed images 126 may be provided in a compressed format, such as a JPG or JPEG, and may be referred to as an output image. The processed image 126 is then received at a communication interface 128 and can be transmitted to another device as the processed output image 130.

In addition to processing the raw image information 108, the image signal processor 110 may process the raw image information 108 to adjust one or more attributes of the acquired image. For example, the image signal processor 110 may adjust a white balance, perform image demosaicing and denoising, adjust one or more colors and/or tones of an image, and then provide a compressed image as the processed image 126. In addition to performing one or more processing functions, the image signal processor 110 may generate image statistical information 116. The image statistical information 116 may correspond to image information for one or more regions, or segments, of the acquired image. For example, the raw image information 108 may be divided, or segmented, into a plurality of regions, such as rectangles or squares in a grid, where each rectangle or square may include information corresponding to a number of pixels. The image statistical information 116 may include statistical information for each of the regions. In some instances, the image statistical information 116 may include location information in a two-dimensional grid, a comprehensive analysis of the image statistics (e.g., an average of all the pixels in the frame), information relating to one or more of image data characteristics, information relating to image configuration, information relating to picture-taking conditions, information relating to scenic lighting, sharpness maps, information relating to automatic exposure, automatic focus, automatic white balance, brightness, intensity, black level compensation, flicker detection, histograms, spatial statistics, thumbnail information, and the like. The image statistical information 116 may be provided to the object-specific image processor 122.

In examples, the object-specific image processor 122 may receive detection information 114 corresponding to one or more objects depicted in the scene 106. That is, the image signal processor 110 may provide a processed image 118 to a deep neural network (DNN) 112. The DNN 112 may include a model 120 specifically trained to detect one or more objects depicted in the processed image 118. For example, the model 120 may be trained on face detection image information such that, when implemented at the DNN 112, the DNN 112 may detect one or more faces of persons depicted in the scene 106. The DNN 112 may then output the detection information 114 corresponding to the one or more detected objects depicted in the scene 106, where the detection information 114 may include location information (e.g., X, Y coordinates) together with window (e.g., a rectangle) size information (e.g., a width and height of a rectangle) that is specific to the detected object. Although described as a rectangle, other shapes and/or functions may be used to specify the location and/or size of the region in the processed image 118 corresponding to the detected object. In some examples, the DNN 112 may include one or more models 120 for detecting a plurality of different objects, such as a body, a face, a plant, a light-source, etc. Alternatively, or in addition, a single model 120 may detect a plurality of different objects.

In addition to the location information and window size information, the detection information 114 may include a confidence level specific to the location of the detected object. For instance, the DNN 112 may determine that a detected object at a specific location is depicted in the scene 106; the confidence level may provide an indication related to how confident the DNN 112 is that the detected object is actually depicted in the scene 106 at the specific location. A high confidence level would indicate that there is a high likelihood that the window at the specific location corresponds to a detected object. A low confidence level would indicate that there is a lower likelihood that the window at the specific location corresponds to the detected object.

The object-specific image processor 122 may generate a weighted object-specific parameter based on object-specific statistical information. For example, the detection information 114 may be utilized to index or otherwise locate image statistical information that is specific to one or more detected objects. That is, the detection information 114 may identify a location and size/shape of a window within the processed image 118 corresponding to a detected object. The location and size/shape of the window may then be used to locate statistical information within the image statistical information 116 corresponding to the location and size/shape of the window. Stated another way, the location of the window and the size/shape of the window may indicate that a plurality of regions or segments within the image statistical information 116 corresponds to the location and the size/shape of the window provided by the detection information 114. Accordingly, a weighted sum of the plurality of regions or segments corresponding to the location of the window may be generated, where such weighted sum may be equal to the weighted object-specific parameter.

In examples, the weighted object-specific parameter together with the corresponding confidence level for each detected object may be combined to generate a weighted-image value. Stated another way, the weighted-image value is based on the weighted object-specific parameter for each detected object and the associated confidence level. The weighted-image value may be compared to a desired value indicating an optimal parameter level. For example, where the weighted object-specific parameter is a brightness parameter, the weighted object-specific parameter may correspond to a brightness value for the detected object. In some examples, the weighted image parameter may be a weighted average brightness for the detected objects. The weighted-average brightness for the detected objects depicted in the scene 106 may be compared to a desired brightness level (e.g., 128). If the weighted-average brightness for the detected objects is less than a desired brightness level, then the object-specific image processor 122 may generate gain and/or exposure adjustment parameters to adjust the image sensor 104. That is, the image sensor 104 may receive the gain and/or exposure parameters and change a gain and/or exposure setting or configuration of the image sensor 104 when acquiring the next image of the scene such that a subsequently generated weighted image parameter is increased and closer to the desired brightness level. If the weighted-average brightness for the detected objects is greater than a desired brightness level, then the object-specific image processor 122 may generate gain and/or exposure adjustment parameters to adjust the image sensor 104. That is, the image sensor 104 may receive the gain and/or exposure parameters 124 and change a gain and/or exposure setting or configuration of the image sensor 104 when acquiring the next image of the scene such that a subsequently generated weighted image parameter is reduced and closer to the desired brightness level.

The gain and/or exposure may be a global parameter and may affect an amount of light received by the image sensor 104 and how such light is converted into signals which is then processed into raw image information 108. Accordingly, the processed output image 130 may be a processed output image acquired by an image sensor 104 having a gain and/or exposure parameter that is configured by the object-specific image processor 122. Further, the gain and/or exposure adjustment parameter may correspond to an incremental adjustment value (e.g., +1/-2) or may correspond to a gain and/or exposure setting.

FIGS. 2A-2B depict aspects related to determining an image sensor parameter based on one or more detected objects in an image in accordance with examples of the present disclosure. In examples, statistical information about an image may be obtained from an example image 202 acquired by an image sensor, such as the image sensor 104 (FIG. 1). While the scene depicted in the example image 202 is of a video conference session, it should be understood that aspects presented herein are equally directed to all types of depicted scenes. As previously discussed, a deep neural network, such as the DNN 112, may be provided with the processed image, such as the processed image 118 (FIG. 1) and detect one or more objects within the processed image. As an example, the DNN 112 may identify one or more detected objects 204a-204e. In examples, the detected object may be a face of a person; however, it should be understood that the DNN 112 may detect other objects within an image.

The DNN 112, based on the detected objects 204a-204e, may output detected object information 206a-206e, such as the detected information 114 (FIG. 1). The detected object information may include a location of a detected object and a bounding region surrounding the detected object. For example, detected object information 206a for a detected object 204a (e.g., face) in the example image 202 may include X,Y coordinates indicating a location of the detected object, and height and width information indicating a bounding region (e.g., a rectangle) surrounding the located detected object. In examples, the X,Y coordinates may identify a lower left corner of the detected object, an upper left corner of the detected object, an upper right corner of the detected object, a lower right corner of the detected object, or a center of the detected object. The bounding region may be identified in relation to the X,Y coordinates and may be configured as a circle, rectangle, plurality of rectangles, function, etc. Of course, the X,Y coordinates may identify another area of the detected object and the bounding region may identify an area of the detected object using other shapes, functions, or area determining tools (e.g., number of pixels within the detected object).

As previously mentioned, the image signal processor, such as the image signal processor 110 (FIG. 1) may generate image statistical information, such as image statistical information 116 (FIG. 1). The image statistical information may correspond to image statistical information for one or more regions, or segments, of the acquired image. For example, the raw image information may be divided, or segmented, into a plurality of regions, such as rectangles or squares in a grid, where each rectangle or square may include information corresponding to a number of pixels. As an example, the example image 208 may be divided into a plurality of rectangles or squares in a grid, where image statistical information for each rectangle or square may be provided by the image signal processor 110. In examples, the image statistical information may be provided in an array format as depicted in FIG. 2A; of course, such image statistical information may be stored or maintained in another format, such as a one-dimensional array, a database, etc. Based on the detected object information, the image statistical information may be indexed and obtained. For example, the detected object information 212 may determine a location of a detected object 210 (e.g., face). The image statistical information associated with the location of the detected object 210 may be obtained based on the detected object information 212 (e.g., X,Y & H,W).

FIG. 2B, illustrates statistical information overlaid on a portion 214a of the example image 202 in accordance with examples of the present disclosure. Each region of the object-specific statistical information 216a may include example statistical information 218. In some instances, the example statistical information 218 may include a comprehensive analysis of the image statistics (e.g., an average of all the pixels in the frame), information relating to one or more of image data characteristics, information relating to image configuration, information relating to picture-taking conditions, information relating to scenic lighting, sharpness maps, information relating to automatic exposure, automatic focus, automatic white balance, brightness, intensity, black level compensation, flicker detection, histograms, spatial statistics, thumbnail information, and the like. The object-specific statistical information 216a may be combined with an object-specific confidence level 220a to generate a weighted object-specific parameter 222a, where the object-specific confidence level 220a is provided by the DNN, such as the DNN 112 (FIG. 1).

In another example, the object-specific statistical information 216b may be combined with an object-specific confidence level 220b to generate a weighted object-specific parameter 222b, where the object-specific confidence level 220b is provided by the DNN. Further, the object-specific statistical information 216c may be combined with an object-specific confidence level 220b to generate a weighted object-specific parameter 222b, where the object-specific confidence level 220b is provided by the DNN. Of course, additional object-specific statistical information 216, confidence levels 220, and weighted object-specific parameters 222 may be generated as shown as 224 and 226 for example. Accordingly, the plurality of weighted object-specific parameters 228, which may include weighted object-specific parameter 222a-c for example, may be combined into a weighted-image value based on the object-specific statistical information 230, where the weighted-image value may represent a value of a parameter or attribute for the example image 202 that is a function of the detected objects depicted in the example image 202. The weighted-image value based on the object-specific statistical information 230 may be used by the image sensor 104 to adjust an image sensor parameter.

FIG. 3 illustrates an example method 300 for obtaining an output image based on detected object information in accordance with examples of the present disclosure. A general order of the operations for the method 300 is shown in FIG. 3. Generally, the method 300 begins with start operation 302 and ends with end operation 318. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2B.

Following start operation 302, the method 300 receives an image from an image sensor at 304. As previously mentioned, the image sensor may be any image sensor configured to detect and convey information used to make an image. In examples, the image sensor may convert light into signals, which are then processed into pixel information at an image signal processor. The image signal processor may receive raw image information and convert the raw image information into a processed image. In examples, the image signal processor may provide the image to a deep neural network (DNN). The image provided to the DNN may be in a raw image format or may be a processed format, such as but not limited to a JPEG format.

After receiving the image, the DNN may generate object detection locations according to one or more models at 306. That is, the DNN may include a model specifically trained to detect one or more objects depicted in the image. For example, the model may be trained on face detection image information such that, when implemented at the DNN, the DNN may detect one or more faces of persons depicted in an image. The DNN may then output the object detection location as object detection information. The object detection information may be provided to an object specific image processor.

In examples, the object detection information may include location information (e.g., X, Y coordinates) together with a bounding region, such as but not limited to a rectangular window that is specific to the detected object. Although described as a rectangle, other shapes and/or functions may be used to specify the location and/or size of the region in the corresponding to the detected object. In some examples, the DNN may include one or more models for detecting a plurality of different objects, such as a body, a face, a plant, a light-source, etc. Alternatively, or in addition, a single model may detect a plurality of different objects.

As previously described, the detection information may include a confidence level specific to the location of the detected object. For instance, the DNN may predict that a detected object is at a specific location in an image. The prediction may be associated with a confidence level that indicates how confident the DNN is that the detected object is actually at the specific location. A high confidence level would indicate that there is a higher likelihood that the location corresponds to a detected object. A low confidence level would indicate that there is a lower likelihood that the location corresponds to the detected object.

The object-specific image processor may receive image statistical information at 308. That is, as previously mentioned, the image signal processor may generate image statistical information corresponding to one or more regions, or segments, of the acquired image. For example, the raw image information may be divided, or segmented, into a plurality of regions, such as rectangles or squares in a grid, where each rectangle or square may include information corresponding to a number of pixels. In examples, the image statistical information may be provided in an array format; based on the detected object information, the image statistical information may be indexed and object-specific statistical information may be obtained. For example, the detected object information may provide a location of a detected object. The image statistical information associated with the location of the detected object may be obtained based on the detected object information (e.g., X,Y & H,W) resulting in object-specific statistical information.

Further, the object-specific statistical information may be combined with an object-specific confidence level to generate a weighted object-specific parameter, where the weighted object-specific parameter takes into account the object specific confidence level and the statistical information accounting for the size or area of the detected object as provided by the detected object information. In examples, the weighted object-specific parameter may depend on other objects detected within an image. For example, the weighted object-specific parameter may be based on the area of the detected object with respect to the total area of all detected objects. As another example, the weighted object-specific parameter may be influenced by common statistical information associated with different areas of the detected object. Of course, other weightings are envisioned. At 310, a plurality of weighted object-specific parameters may be combined into a weighted-image value, where the weighted-image value may represent a value of a parameter or attribute for an image that is a function of the detected objects depicted in the image, the statistical information associated with the detected objects, and the confidence level associated with the respective detected objects.

At 312, the weighted-image value may be used to generate a sensor parameter. For example, the weighted-image value may be compared to a desired image parameter. If the weighted-image value is less than a desired image parameter, the object-specific image processor may generate one or more adjustment parameters. In examples, the adjustment parameters may increase or decrease a configuration setting of the image sensor. For example, the adjustment parameter may increase or decrease at least one of the gain and/or exposure of the image sensor. If the weighted-image value is greater than a desired image parameter, the object-specific image processor may generate gain and/or exposure adjustment parameters to decrease or increase at least one of the gain and/or exposure of the image sensor. The gain and/or exposure adjustment parameter may be a global parameter and may affect an amount of light received by the image sensor and how such light is converted into signals which is then processed into an image. The gain and/or exposure adjustment parameter may correspond to an incremental adjustment value (e.g., +1/−2) or may correspond to a gain and/or exposure setting.

At 314, the image sensor may receive the adjustment parameter and update a configuration or setting of the image sensor. Accordingly, a subsequently acquired image may be obtained using the updated configuration or setting of the image sensor. In examples, the subsequently acquired image may be more optimally acquired in terms of brightness, for example, specific to the detected objects within the image. Accordingly, a processed image may be output at 316 and the method 300 may end at 318.

FIG. 4 illustrates an example method 400 for obtaining an output image based on detected object information in accordance with examples of the present disclosure. A general order of the operations for the method 400 is shown in FIG. 4. Generally, the method 400 begins with start operation 402 and ends with end operation 420. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3.

Following start operation 402, the method 400 receives an image from an image sensor at 404. As previously mentioned, the image sensor may be any image sensor configured to detect and convey information used to make an image. In examples, the image sensor may convert light into signals, which are then processed into pixel information at an image signal processor. The image signal processor may receive raw image information and convert the raw image information into a processed image. In examples, the image signal processor may provide the image to a deep neural network (DNN). The image provided to the DNN may be in a raw image format or may be a processed format, such as but not limited to a JPEG format.

After receiving the image, the DNN may generate detected face locations according to one or more models at 406. That is, the DNN may include a model specifically trained to detect faces of persons in the image. The DNN may then output the face detection locations as object detection information. The object detection information may be provided to an object specific image processor.

In examples, the object detection information may include location information (e.g., X, Y coordinates) together with a bounding region, such as but not limited to a rectangular window that is specific to the detected object. Although described as a rectangle, other shapes and/or functions may be used to specify the location and/or size of the region in the corresponding to the detected object. In some examples, the DNN may include one or more models for detecting a plurality of different objects, such as a body, a plant, a light-source, etc. Alternatively, or in addition, a single model may detect a plurality of different objects.

As previously described, the detection information may include a confidence level specific to the location of the detected face. For instance, the DNN may predict that a detected face is at a specific location in an image. The prediction may be associated with a confidence level that indicates how confident the DNN is that the detected face is actually at the specific location. A high confidence level would indicate that there is a higher likelihood that the location corresponds to a detected face. A low confidence level would indicate that there is a lower likelihood that the location corresponds to the detected face.

The object-specific image processor may receive image statistical information at 408. That is, as previously mentioned, the image signal processor may generate image statistical information corresponding to one or more regions, or segments, of the acquired image. For example, the raw image information may be divided, or segmented, into a plurality of regions, such as rectangles or squares in a grid, where each rectangle or square may include information corresponding to a number of pixels. In examples, the image statistical information may be provided in an array format; based on the detected object information, the image statistical information may be indexed and object-specific statistical information may be obtained. For example, the detected object information may provide a location of a detected object. The image statistical information associated with the location of the detected object may be obtained based on the detected object information (e.g., X,Y & H,W) resulting in object-specific statistical information.

Further, the object-specific statistical information may be combined with an object-specific confidence level to generate a weighted object-specific parameter, where the weighted object-specific parameter takes into account the object specific confidence level and the statistical information accounting for the size or area of the detected object as provided by the detected object information. In examples, the weighted object-specific parameter may depend on other objects detected within an image.

At 410, a plurality of weighted object-specific parameters may be combined into a weighted-image value, where the weighted-image value may represent a value of a parameter or attribute for an image that is a function of the detected faces depicted in the image, the statistical information associated with the detected faces, and the confidence level associated with the respective detected faces.

At 412 and 414, the weighted-image value may be used to generate a sensor parameter. For example, the weighted-image value may be compared to a desired brightness level. If the weighted-image value is less than the desired brightness level, the object-specific image processor may generate one or more exposure and/or gain adjustment parameters. In examples, the one or more exposure and/or gain adjustment parameters may increase or decrease the gain and/or exposure of the image sensor. For example, if the weighted-image value is less than a desired brightness level at 412 (e.g., 128), the object-specific image processor may generate gain and/or exposure adjustment parameters at 416 to decrease or increase at least one of the gain and/or exposure of the image sensor. If the weighted-image value is greater than a desired brightness level at 414 (e.g., 128), the object-specific image processor may generate gain and/or exposure adjustment parameters at 416 to increase or decrease at least one of the gain and/or exposure of the image sensor. The gain and/or exposure adjustment parameter may be a global parameter and may affect an amount of light received by the image sensor and how such light is converted into signals which is then processed into an image. As previously described, the gain and/or exposure adjustment parameter may correspond to an incremental adjustment value (e.g., +1/−2) or may correspond to a gain and/or exposure setting.

At 418, the image sensor may receive the gain and/or adjustment parameters and update a configuration or setting of the image sensor. Accordingly, a subsequently acquired image may be obtained using the updated gain and/or adjustment parameters of the image sensor. In examples, the subsequently acquired image may be more optimally acquired in terms of brightness, for example, specific to the detected faces within the image. Accordingly, a processed image may be output and the method 400 may end at 420.

FIG. 5 is a block diagram of an exemplary computing system 502 that is configured to implement the object specific image processing techniques described herein. In various examples, the computing system 502 includes one or more of the image acquisition devices 102 of FIG. 1 or is the same as similar to the image acquisition device 102. The computing system 502 includes one or more processors (or processing units), such as the processor 504, and the memory 506. The processor 504 and memory 506, as well as other components, are interconnected by way of a system bus 518. The memory 506 typically (but not always) includes both volatile memory 508 and non-volatile memory 510. The volatile memory 508 retains or stores information so long as the memory is supplied with power. By contrast, the non-volatile memory 510 is capable of storing (or persisting) information even when a power supply is not available. Generally speaking, RAM and CPU cache memory are examples of volatile memory 508, whereas ROM, solid-state memory devices, memory storage devices, and/or memory cards are examples of non-volatile memory 510.

The processor 504 executes instructions retrieved from the memory 506 and/or from computer-readable storage media, such as computer-readable storage medium 520, in carrying out various functionalities, such as the functionalities of the object specific image processing techniques described herein. Moreover, the processor 504 may include any of a number of available processors, such as a single-processor, a multi-processor, single-core units, and/or multi-core units.

The computing system 502 also includes a communication component 512 for interconnecting the computing system 502 with other devices and/or services over a communication medium, such as but not limited to a computer network, a USB® connection, or other communication connection. The communication component 512 may communicate over a network using one or more communication protocols via a physical/tangible (e.g., wired, optical, etc.) connection, a wireless connection, or both. As will be readily appreciated by those skilled in the art, a communication component 512 typically includes hardware and/or firmware components (and may also include executable software components) that transmit and receive digital and/or analog signals over a transmission medium (i.e., the network).

The computing system 502 may include an input/output (I/O) subsystem. The I/O subsystem includes a set of hardware, software, and/or firmware components that enable or facilitate inter-communication between the user of the computing system 502 and the processor of the computing system 502. Indeed, via the I/O subsystem, the user may provide input via one or more input channels, such as, by way of illustration and not limitation, one or more buttons.

The image sensor 514 may be any image sensor configured to detect and convey information used to make an image. In examples, the image sensor 514 may convert light into signals, which are then processed into pixel information at an image signal processor 516. The image sensor 514 may be a charge-coupled device (CCD) type image sensor, an active pixel type image sensor, such as a complimentary metal-oxide semiconductor (CMOS) image sensor, or the like. The computing system 502 may be configured to acquire a video stream utilizing the image sensor 514. The video stream includes a series of video frames, wherein each video frame includes a sequence of images. In various examples, the computing system 502 is located in the vicinity of a display device. For example, the computing system 502 has an image capture component that faces outwardly and is capable of capturing a frontal view of one or more users' faces when the user is viewing the display device. The computing system 502 may be, for example, a front-facing camera integrated into a computing system, or an external camera that is attached to a display device in any suitable manner.

According to examples, the computer-readable storage medium 520 includes the deep neural network (DNN) 524 and the object-specific image processor 526. In some examples, the image signal processor 516 may be included in the computer-readable storage medium 520; alternatively, or in addition, the image signal processor 516 may be separate from the computer-readable storage medium 520. The image signal processor 516 and/or the image signal processor 522 may be the same as or similar to the image signal processor 110 (FIG. 1) previously discussed. The DNN 524 may be the same as or similar to the DNN 112 (FIG. 1) previously discussed. The object-specific image processor 526 may be the same as or similar to the object-specific image processor 122 previously discussed.

In various examples, the computing system 502 provides image sensor adjustment parameters in real-time, meaning that there is no significant latency between the acquisition of an image and the generation of the image sensor update parameters. In other words, the image signal processor 516, image signal processor 522, DNN 524, and the object-specific image processor 526 are configured to run at substantially the same rate as the frame rate of the computing system 502 without any significant lag time.

In various examples, the image signal processor 522 and/or the object-specific image processor 526 include a number of sub-modules (not shown) for detecting objects and adjusting one or more image sensor parameters. Further details relating to the functionality of the DNN 524 and/or the object-specific image processor 526 (and corresponding sub-modules) are described further with respect to FIGS. 1-4.

The block diagram of FIG. 5 is not intended to indicate that the computing system 502 is to include all of the components shown in FIG. 5. Rather, the computing system 502 can include fewer or additional components not illustrated in FIG. 5, depending on the details of the specific implementation. Furthermore, any of the functionalities of the image signal processor 522, DNN 524, or the object-specific image processor 526 may be partially, or entirely, implemented in hardware and/or in the processor 504. For example, any of the functionalities of the image signal processor 522, DNN 524, and/or the object-specific image processor 526 may be implemented using an application specific integrated circuit (ASIC), using logic implemented in the processor 504, and/or using any other suitable component or device.

As described herein, in some examples, the functionalities of the computing system 502 are provided as a software application that is licensed to the user and delivered to a user's computing system 502. As another example, in some examples, the functionalities of the computing system 502 are provided as a cloud-based, online video streaming service.

FIG. 6 is a schematic view 602 depicting the manner in which the image signal processor 522, DNN 524, or the object-specific image processor 526 of FIG. 5 may be implemented within the computer-readable storage medium 612, which may be the same as or similar to the computer-readable storage medium 520 of FIG. 5. As shown in FIG. 6, the image signal processor 522, DNN 524, or the object-specific image processor 526, depicted as 604, includes computer-readable data 610. The computer-readable data 610 make up a set of computer-executable instructions 608 that, when executed by the processor 504, cause the processor 504 to perform one or more methods 606 for adjusting an image sensor parameter, such as any of the described examples of FIGS. 1 and 2, respectively, and/or the exemplary method 300 and/or 400 described with respect to FIGS. 3 and 4, respectively.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The present disclosure relates to systems and methods for adjusting an image based on a detected object depicted in the image according to at least the examples provided in the sections below:

(A1) In one aspect, some examples include a method for adjusting an image based on a detected object depicted in the image, the method comprising. The method may include: receiving an image from an image sensor, receiving statistical information associated with the image, detecting an object depicted in the image using a deep neural network, identifying object-specific statistical information for the detected object, generating a weighted object-specific parameter based on the object-specific statistical information, generating a weighted-image value based on the weighted object-specific parameter, providing the weighted-image value to the image sensor and acquiring an image from the image sensor updated with the one or more image sensor parameters.

(A2) In some examples of A1, the method further includes: detecting a second object depicted in the image using the deep neural network; identifying second object-specific statistical information for the detected second object based on the received statistical information; and generating a second weighted object-specific parameter based on the second object-specific statistical information, wherein the weighted-image value is based on the weighted object-specific parameter and the second weighted object-specific parameter.

(A3) In some examples of A1-A2, the deep neural network is configured to perform face detection, and the object is a face of a person depicted in the image.

(A4) In some examples of A1-A3, the one or more image sensor parameters include at least one of a global exposure or a global gain parameter associated with the image sensor.

(A5) In some examples of A1-A4, identifying object-specific statistical information for the detected object includes receiving detection information associated with the detected object and indexing the statistical information associated with the image based on the detection information.

(A6) In some examples of A1-A5, the detection information includes location information within the received image, the location information identifying a location within the received image of the detected object.

(A7) In some examples of A1-A6, the statistical information includes brightness information associated with a plurality of segmented regions of the received image.

(A8) In some examples of A1-A7, the weighted object-specific parameter is based on a confidence level associated with the detection of the detected object, the confidence level being provided by the deep neural network.

In yet another aspect, some examples include a system including one or more processors and memory coupled to the one or more processors, the memory storing one or more instructions which when executed by the one or more processors, causes the one or more processors to perform any of the methods described herein (e.g., A1-A7 described above).

In yet another aspect, some examples include a computer-readable storage medium storing one or more programs for execution by one or more processors of a device, the one or more programs including instructions for performing any of the methods described herein (e.g., A1-A7 described above).

(B1) In one aspect, some examples include a method for adjusting an image based on a detected object depicted in the image. The method may include receiving statistical information associated with an image; receiving object detection information from a deep neural network, the object detection information including location information for an object depicted in the image; identifying object-specific statistical information based on the object detection information; generating a weighted object-specific parameter based on the object-specific statistical information; generating a weighted-image value based on the weighted object-specific parameter; providing the weighted-image value to an image sensor, wherein the image sensor is configured to update one or more image sensor parameters based on the weighted-image value; and acquiring an image from the image sensor updated with the one or more image sensor parameters.

(B2) In some examples of B1, the object detection information includes second location information for a second object depicted in the image, and the weighted-image value is based on the weighted object-specific parameter and a second weighted object-specific parameter generated based on second object-specific statistical information obtained from the statistical information for second location information associated with the second object depicted in the image.

(B3) In some examples of B1-B2, the deep neural network is configured to perform face detection, and the object is a face of a person depicted in the image.

(B4) In some examples of B1-B3, the one or more image sensor parameters include at least one of a global exposure or a global gain parameter associated with the image sensor.

(B5) In some examples B1-B4, identifying object-specific statistical information for the detected object includes indexing the statistical information associated with the image based on the detection information.

(B6) In some examples of B1-B5, the statistical information includes brightness information associated with a plurality of segmented regions of the received image.

(B7) In some examples of B1-B6, the weighted object-specific parameter is based on a confidence level associated with the detection of the detected object, the confidence level being provided by the deep neural network.

(B8) In some examples of B1-B7, a processor and memory are included in camera unit, the camera unit including an image sensor.

In yet another aspect, some examples include a system including one or more processors and memory coupled to the one or more processors, the memory storing one or more instructions which when executed by the one or more processors, causes the one or more processors to perform any of the methods described herein (e.g., B1-B8 described above).

In yet another aspect, some examples include a computer-readable storage medium storing one or more programs for execution by one or more processors of a device, the one or more programs including instructions for performing any of the methods described herein (e.g., B1-B8 described above).

(C1) In one aspect, some examples include a method for adjusting an image based on a detected object depicted in the image. The method may include receiving an image from an image sensor; receiving statistical information associated with the image; detecting a plurality of objects depicted in the image using a deep neural network; identifying object-specific statistical information for the plurality of detected objects; generating weighted object-specific parameters for each of the detected objects based on respective object-specific statistical information; generating a weighted-image value based on the weighted object-specific parameters; and providing the weighted-image value to the image sensor, wherein the image sensor is configured to update one or more image sensor parameters based on the weighted-image value.

(C2) In some examples of C1, the deep neural network is configured to perform face detection, and the plurality of detected objects are faces of persons depicted in the image.

(C3) In some examples of C1-C2, the statistical information includes brightness information associated with a plurality of segmented regions of the received image.

(C4) In some examples of C1-C3, the weighted object-specific parameters are based on confidence levels associated with the detection of the detected objects, the confidence levels being provided by the deep neural network.

In yet another aspect, some examples include a system including one or more processors and memory coupled to the one or more processors, the memory storing one or more instructions which when executed by the one or more processors, causes the one or more processors to perform any of the methods described herein (e.g., C1-C4 described above).

In yet another aspect, some examples include a computer-readable storage medium storing one or more programs for execution by one or more processors of a device, the one or more programs including instructions for performing any of the methods described herein (e.g., C1-C4 described above).

What is claimed is:

1. A method of adjusting an image based on a detected object depicted in the image, the method comprising:
   receiving a raw image from an image sensor;
   identifying at least one portion in the raw image where the at least one portion requires parameter adjustment;
   receiving statistical information associated with the at least one portion of the raw image;
   detecting an object depicted in the raw image using a deep neural network;
   identifying object-specific statistical information for the detected object by segmenting the detected at least one portion of the raw image and analyzing each segment individually;
   generating a weighted object-specific parameter based on the object-specific statistical information, wherein the weighted object-specific parameter is equal to a sum of a plurality of segments corresponding to a location of a window, in which the window is used to locate the object-specific statistical information;
      wherein the raw image is comprising a plurality of windows and the plurality of windows is evaluated according to locations of the plurality of windows indicating a plurality of regions or segments that include information corresponding to a number of pixels;
   generating a weighted-image value based on the weighted object-specific parameter;
   providing the weighted-image value to the image sensor, wherein the image sensor is configured to update one or more image sensor parameters based on the weighted-image value; and
   acquiring an image from the image sensor updated with the one or more image sensor parameters.

2. The method of claim 1, further comprising:
   detecting a second object depicted in the raw image using the deep neural network;
   identifying second object-specific statistical information for the detected second object based on the received statistical information; and
   generating a second weighted object-specific parameter based on the second object-specific statistical information,
   wherein the weighted-image value is based on the weighted object-specific parameter and the second weighted object-specific parameter.

3. The method of claim 1, wherein the deep neural network is configured to perform face detection, and the object is a face of a person depicted in the raw image.

4. The method of claim 1, wherein the one or more image sensor parameters include at least one of a global exposure or a global gain parameter associated with the image sensor.

5. The method of claim 1, wherein identifying object-specific statistical information for the detected object includes receiving detection information associated with the detected object and indexing the statistical information associated with the raw image based on the detection information.

6. The method of claim 5, wherein the detection information includes location information within the received raw image, the location information identifying a location within the received raw image of the detected object.

7. The method of claim 1, wherein the statistical information includes brightness information associated with a plurality of segmented regions of the received image.

8. The method of claim 1, wherein the weighted object-specific parameter is based on a confidence level associated with the detection of the detected object, the confidence level being provided by the deep neural network.

9. A computing apparatus comprising:
   a processor; and
   a memory storing instructions that, when executed by the processor, configure the apparatus to:
      receive statistical information associated with a raw image;
      identify at least one portion in the raw image where the at least one portion requires parameter adjustment;
      receive object detection information from a deep neural network, the object detection information including location information for an object depicted in at least one portion of the raw image;
      identify object-specific statistical information based on the object detection information by segmenting the detected at least one portion of the raw image and analyze each segment individually;
      generate a weighted object-specific parameter based on the object-specific statistical information, wherein the weighted object-specific parameter is equal to a sum of a plurality of segments corresponding to a location of a window, in which the window is used to locate the object-specific statistical information;
         wherein the raw image is comprising a plurality of windows and the plurality of windows is evaluated according to locations of the plurality of windows indicating a plurality of regions or segments that include information corresponding to a number of pixels;
      generate a weighted-image value based on the weighted object-specific parameter;
      provide the weighted-image value to an image sensor, wherein the image sensor is configured to update one or more image sensor parameters based on the weighted-image value; and
      acquire an image from the image sensor updated with the one or more image sensor parameters.

10. The computing apparatus of claim 9, wherein the object detection information includes second location information for a second object depicted in the raw image, and the weighted-image value is based on the weighted object-specific parameter and a second weighted object-specific parameter generated based on second object-specific statistical information obtained from the statistical information for second location information associated with the second object depicted in the raw image.

11. The computing apparatus of claim 9, wherein the deep neural network is configured to perform face detection, and the object is a face of a person depicted in the raw image.

12. The computing apparatus of claim 9, wherein the one or more image sensor parameters include at least one of a global exposure or a global gain parameter associated with the image sensor.

13. The computing apparatus of claim 9, wherein identifying object-specific statistical information for the detected object includes indexing the statistical information associated with the raw image based on the detection information.

14. The computing apparatus of claim 9, wherein the statistical information includes brightness information associated with a plurality of segmented regions of the received image.

15. The computing apparatus of claim 9, wherein the weighted object-specific parameter is based on a confidence level associated with the detection of the detected object, the confidence level being provided by the deep neural network.

16. The computing apparatus of claim 9, wherein the processor and memory are included in camera unit, the camera unit including an image sensor.

17. A computer-readable storage medium including instructions that when executed by a processor, cause the processor to:
receive a raw image from an image sensor;
identify at least one portion in the raw image where the at least one portion requires parameter adjustment;
receive statistical information associated with the at least one portion of the raw image;
detect a plurality of objects depicted in the raw image using a deep neural network;
identify object-specific statistical information for the plurality of detected objects by segmenting the detected at least one portion of the raw image and analyzing each segment individually;
generate weighted object-specific parameters for each of the detected objects based on respective object-specific statistical information, wherein the weighted object-specific parameter is equal to a weighted sum of a plurality of segments corresponding to a location of a window, in which the window is used to locate the object-specific statistical information;
wherein the raw image is comprising a plurality of windows and the plurality of windows is evaluated according to locations of the plurality of windows indicating a plurality of regions or segments that include information corresponding to a number of pixels;
generate a weighted-image value based on the weighted object-specific parameters; and
provide the weighted-image value to the image sensor, wherein the image sensor is configured to update one or more image sensor parameters based on the weighted-image value.

18. The computer-readable storage medium of claim 17, wherein the deep neural network is configured to perform face detection, and the plurality of detected objects are faces of persons depicted in the image.

19. The computer-readable storage medium of claim 17, wherein the statistical information includes brightness information associated with a plurality of segmented regions of the received image.

20. The computer-readable storage medium of claim 17, wherein the weighted object-specific parameters are based on confidence levels associated with the detection of the detected objects, the confidence levels being provided by the deep neural network.

* * * * *